United States Patent [19]

Planeta

[11] Patent Number: 4,479,766
[45] Date of Patent: Oct. 30, 1984

[54] APPARATUS FOR THE PRODUCTION OF PLASTIC FILM

[75] Inventor: Mirek Planeta, Burlington, Canada

[73] Assignee: Macro Engineering Company, Mississauga, Canada

[21] Appl. No.: 504,184

[22] Filed: Jun. 14, 1983

[51] Int. Cl.³ .................... B29C 25/00; B29D 7/20
[52] U.S. Cl. .................... 425/72 R; 264/209.4;
264/237; 264/564; 264/569; 425/172;
425/326.1; 425/387.1; 425/392
[58] Field of Search .................... 425/172, 392, 72 R,
425/326.1, 387.1, 140; 264/569, 566, 564, 565,
209.4, 237

[56] References Cited

U.S. PATENT DOCUMENTS

| | | | |
|---|---|---|---|
| 3,151,358 | 10/1964 | Gerber | 425/326.1 |
| 3,284,552 | 11/1966 | Haley | 264/209.4 |
| 4,388,061 | 6/1983 | Bebok | 425/392 |
| 4,434,129 | 2/1984 | Bose | 425/72 R |

*Primary Examiner*—Jay H. Woo
*Assistant Examiner*—Timothy W. Heitbrink
*Attorney, Agent, or Firm*—Hirons, Rogers & Scott

[57] ABSTRACT

Apparatus for the production of plastic film by the extrusion of a tube thereof includes a first air ring disposed at the die exit and delivering an annular stream of cooling air to the surface of the emerging tube, which is in a stable expansion phase as it escapes the die internal pressure. Preferably the stream is directed axially of the tube path. The apparatus includes the combination of a sizing cage and a second air ring that is mounted for longitudinal movement along the tube. The tube is established with the air rings close together and they are moved as soon as possible as far apart as possible. The second air ring is located just below where the tube begins to expand and delivers an annular stream of air, preferably in a known manner away from the tube to form a vacuum which stabilizes the tube. The cooling air stream from the second ring can be high since the tube is again in a stable expansion phase with the material at an appropriate temperature. The attached sizing cage supports the tube and holds it concentric with the second air ring against turbulence and the possibility of oscillation. An additional mechanical or air tube stabilizer may be provided at the inlet to the second air ring consisting of a ring of rollers of low friction coefficient material.

6 Claims, 4 Drawing Figures

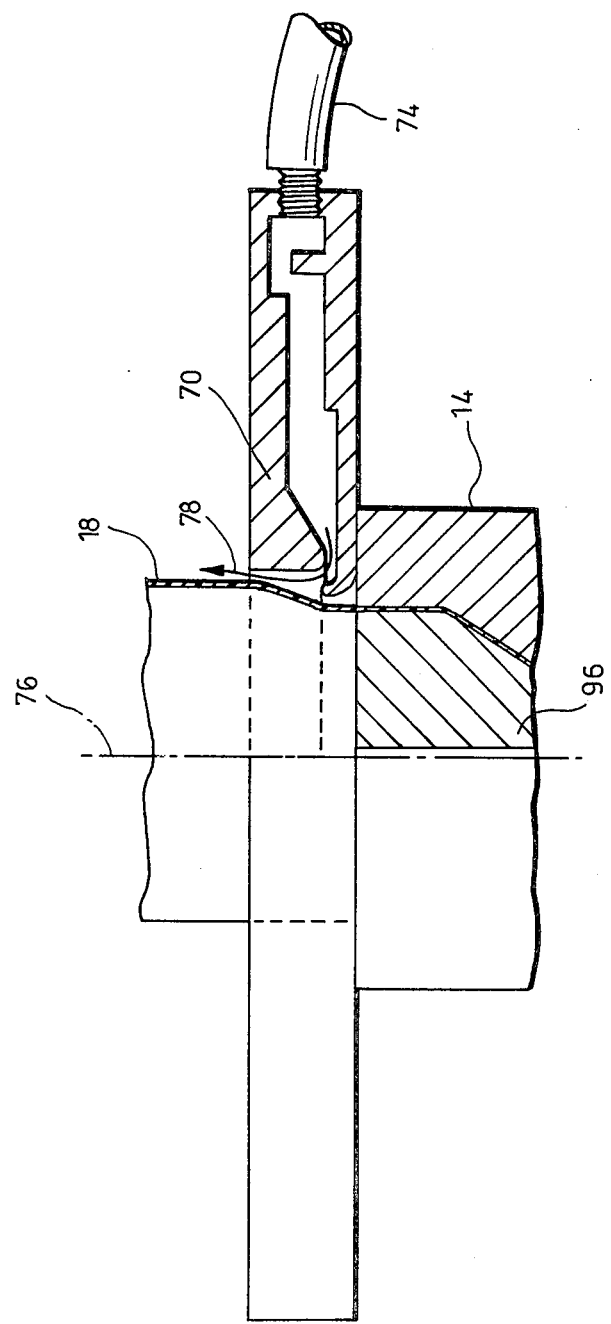

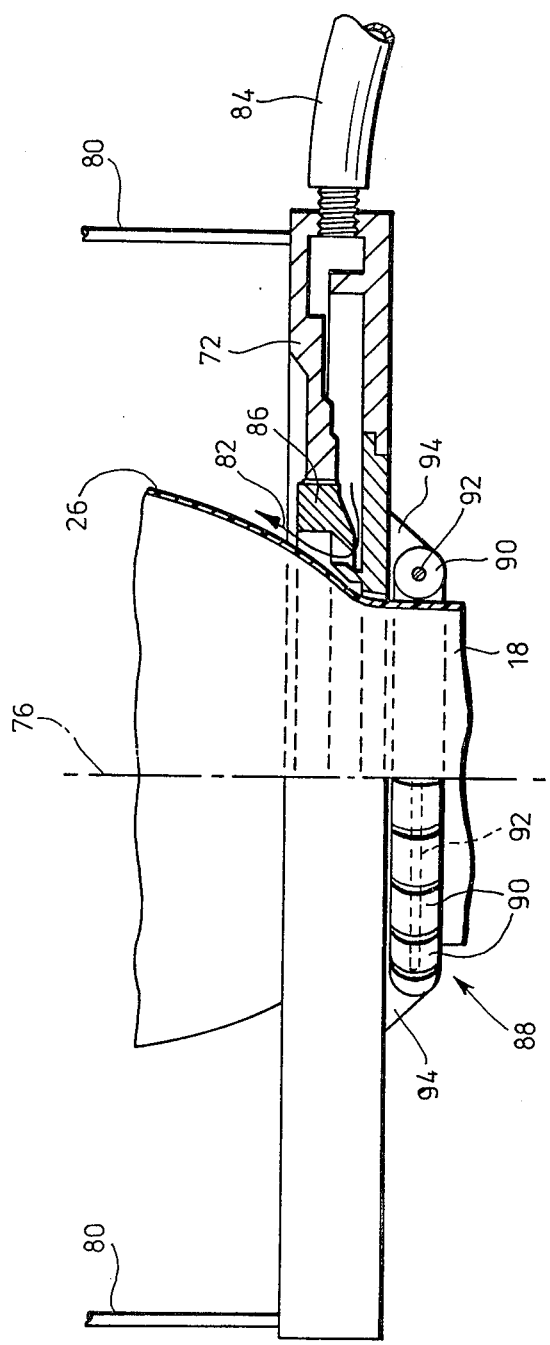

APPARATUS FOR THE PRODUCTION OF PLASTIC FILM

FIELD OF THE INVENTION

The present invention is concerned with apparatus for the production of plastic film by the extrusion of a tube thereof.

REVIEW OF THE PRIOR ART

One of the standard methods for the production of plastic film is to supply the plastic material from an extruder to a die, which discharges an annular tube of the molten material. The hot tube emerging from the die is cooled as quickly as possible, usually by means of one or more air rings, each of which encircles the moving tube and discharges an annular stream of cooling air towards it. If a single air ring is used it may have two or more axially spaced orifices to provide a corresponding number of separate axially-spaced streams. Rapid cooling is desired since the rate of extrusion can then be increased, increasing the output of the combination of extruder, die and air ring. There are however practical upper limits to the velocity and quantity of the air that can be directed toward the relatively fragile tube from a single ring or orifice without making it unstable and/or deleteriously affecting the quality of the film, and it is principally for this reason that a plurality of axially-spaced "stacked" rings, or a ring with a plurality of axially-spaced "stacked" orifices have been used instead of a single-orifice single ring.

It is almost universal practice for the tube to be "blown" to a larger diameter upon its emergence from the die by feeding pressurised air into its interior, since this is the most practical way of making thin film. Little or no problem would exist if the apparatus were able to operate with constant ambient conditions of temperature and pressure, with the same polymer of constant properties, and for the production of film of the same thickness, so that the blow-up ratio of the tube can remain constant, but in practice all of these parameters can vary widely. Little difficulty is experienced in choosing the diameter of the first air ring or orifice, since this is usually located downstream immediately at the die outlet orifice and before the emerging tube has begun to increase in diameter.

Great difficulty is however experienced in arranging for any succeeding air ring or orifice, since its diameter must be fixed beforehand, and it is then found that this causes severe problems in its location along the tube and the operation of the system. For example, if the rate of extrusion from the die is changed then the blow-up ratio at the second air ring location will also change; if the rate is increased the tube reduces in diameter and the air ring becomes less effective, while if the rate decreases and the tube increases too much in diameter it will foul the ring and disrupt the tube.

DEFINITION OF THE INVENTION

It is therefore an object of the invention to provide new apparatus for the production of plastic film by the extrusion of a tube thereof, the apparatus employing two axially-spaced stacked air rings whose axial spacing can readily be adjusted.

In accordance with the present invention there is provided apparatus for the production of plastic film by the extrusion of a tube of molten plastics material from the die outlet of a die in a tube path having a tube longitudinal axis, the apparatus comprising:

a first air ring adapted to be mounted in the immediate neighbourhood of the die outlet surrounding the tube path, a sizing cage adapted to surround the tube path and to receive the tube of cooled material and to constrain it transversely during longitudinal movement in the tube path through the cage, means mounting the sizing cage for movement longitudinally of the tube path parallel to the tube longitudinal axis, and a second air ring mounted on the sizing cage to surround the tube path between the first air ring and the sizing cage, and movable with the sizing cage to move longitudinally of the tube path.

Preferably, the first air ring is of a type which discharges its cooling air substantially parallel to the said longitudinal axis of the tube path, while the second air ring is of a type which discharges its cooling air away from the said longitudinal axis to create a vacuum force that assists in stabilizing the tube in its movement through the second air ring.

DESCRIPTION OF THE DRAWINGS

Apparatus which is a particular preferred embodiment of the invention will now be described, by way of example, with reference to the accompanying diagrammatic drawings, wherein:

FIG. 3 is a part side elevation and part transverse cross-section through the die and first air upstream ring of the installation of FIG. 1; and FIG. 4 is a part side elevation and part transverse cross-section similar to FIG. 3 through the second downstream air ring of the installation of FIG. 1.

DESCRIPTION OF THE PREFERRED EMBODIMENT

Figure 1:
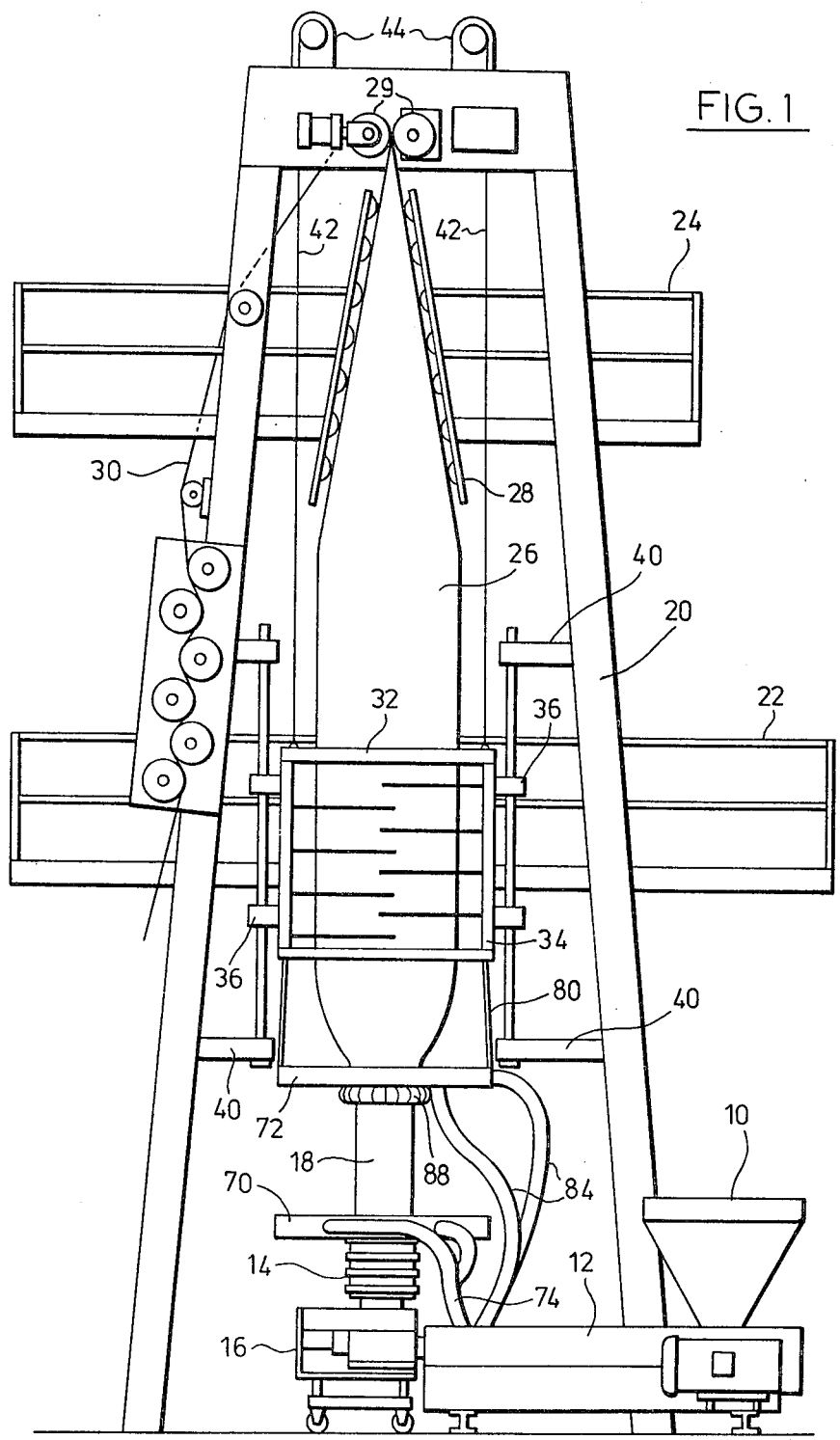
FIG. 1 is a view in side elevation of an installation for the production of plastic film and including the apparatus of the invention.

The plastics material from which the tube is to be formed, usually in the form of pellets, is fed into the hopper 10 of a screw extruder 12 in which it is heated until it is molten, and from which it is fed under pressure to a die 14 mounted on a die cart 16. A tube 18 of the molten material is extruded from an annular outlet of the die and moves vertically upward in a corresponding vertically-extending tube path within a vertically-extending apparatus frame 20 provided with horizontal operator's platforms 22 and 24. In known manner air under pressure is fed to the interior of the tube causing it to expand to a larger diameter, this expanded portion being given the reference 26. The ratio between the diameter at 18 and that at 26 is known as the "blow-up" ratio. The expanded solidified tube is gathered at the top of the frame 20 by a collapsing frame 28 and gathering rolls 29, and the resulting flattened tube 30 is fed downwards in known manner by guide rollers to be rolled or otherwise further handled.

The apparatus of the invention comprises a sizing frame indicated generally by the reference 32 which surrounds the lower part of the expanded portion 26 of the tube and guides the tube during the final stage of solidification of the plastics material. The frame is shown in greater detail in FIG. 2 and consists of a rigid rectangular framework 34 mounted by guide sleeves 36 on spaced, parallel, vertical guide bars 38 which are in turn rigidly mounted on the frame 20 by bracket members 40. The frame is moved vertically on the guide bars by means of suspending cables 42 which are wound and unwound as required by operator-controlled electric winches 44 at the top of the frame 20.

The sizing frame that preferably is employed is that described in either of my U.S. patent application Ser. No. 504,185 and file respectively Jun., 14, 1983 and concurrently herewith, and assigned to Macro Engineering Ltd., the disclosures of which are incorporated herein by this reference. The framework 34 is constituted by rigidly-connected vertical and horizontal members, and there is mounted at each of the four corners of the frame a vertically extending longitudinal support shaft 46 (only one can be seen in FIG. 2) mounted for rotation about a corresponding vertical axis. Each shaft has mounted thereon a pair of triangular plates 48 and 50 constituting respective bell-crank levers rotatable about the said vertical axis. The four plates 48 at the upper ends of the levers are connected by rigid rods 52 for simultaneous pivoting movement about the said vertical axis, while the four plates 50 at the lower ends are similarly connected by rigid rods 54. Each of the rods is pivotally connected at its ends to the respective plates and, if required, may be adjustable in length for adjustment of the phase of rotation of the four support shafts 46.

Figure 2:
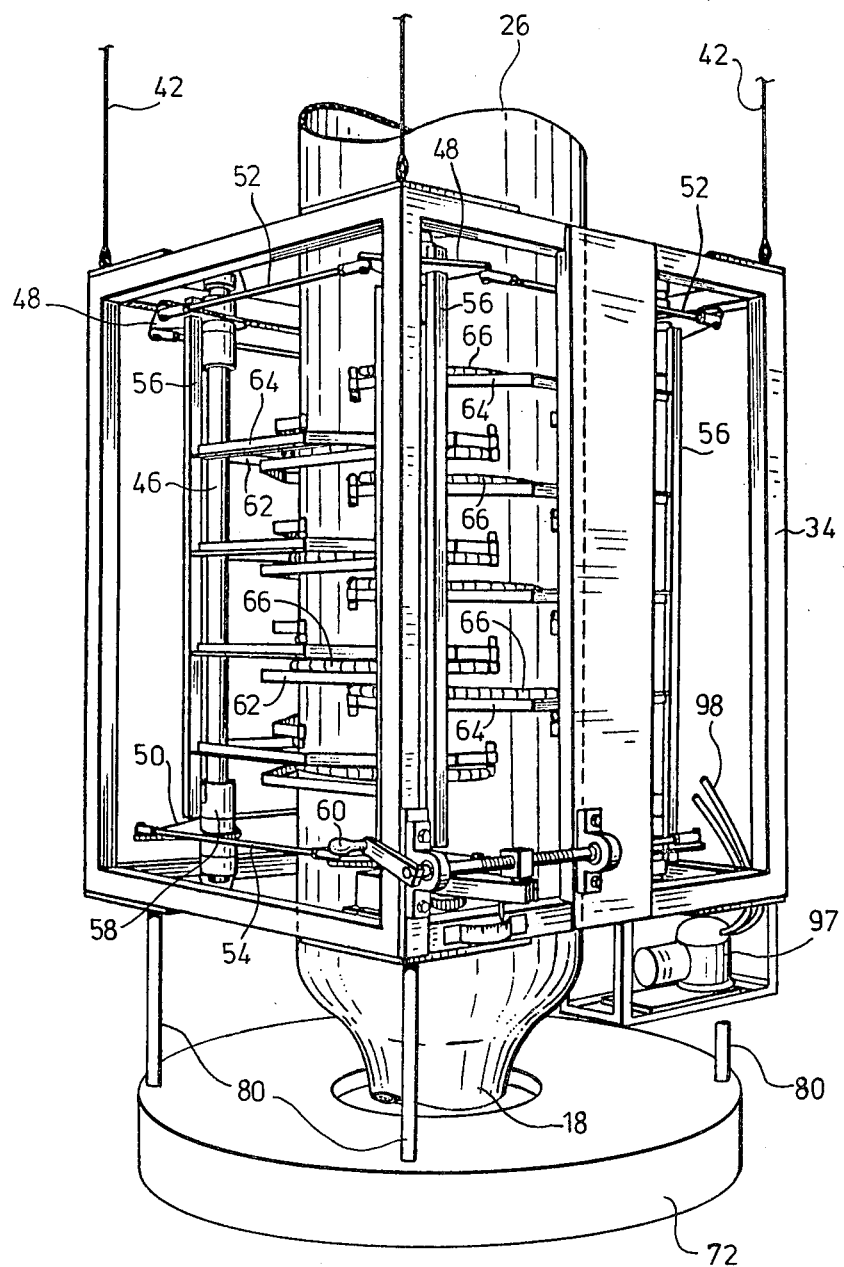
FIG. 2 is a perspective view to a larger scale of the sizing cage and second air ring of the installation of FIG. 1.

The lower plates 50 are rigidly connected to their respective support shafts 46 to rotate therewith, while the upper plates 48 are freely rotatable on the shafts 46 and carry respective vertically extending arm-supporting members 56 having their lower ends supported on shafts 46 by bearings 58. The shafts 46 and the arm-supporting members 56 are connected together by pinion gears so that rotation of one set causes simultaneous rotation of the other set, this rotation being produced as required by an operator rotating a handle 60 (FIG. 2).

Each of the vertical shafts 46 carries a plurality of vertically spaced horizontal radially inwardly extending arms 62, while each of the arm supporting members 56 carries a like plurality of similar horizontal vertically spaced arms 64. Each arm 62 has an immediately adjacent arm 64 cooperating therewith, the two arms being as close together vertically as possible and crossing each other as seen in plan. A flexible wire support member 66 extends between the ends of each two cooperating arms 62 and 64 to engage the outside surface of the plastic tube 10 for its guidance and support. Each member 66 carries a sufficient number of short rollers to extend the full length of the wire in side-by-side contact with one another, the rollers being freely rotatable on the wire to minimize their frictional contact with the tube surface. These rollers preferably are of a plastic material such as a nylon or Teflon (trade mark).

When the arms 62 and 64 are moved to their radially-outermost position the flexible support members 66 can conform to the circumference of a tube of the greatest diameter to be handled by the sizing cage, the length of each support member 66 being such that in this position it extends over a 90° quadrant of the circumference plus an additional amount of about 5°, so that the tube is guided over its entire circumference, each set of four support members at about the same level completely encircling the tube. If the blow-up ratio of this portion 26 of the tube 18 is decreased and a smaller diameter tube is produced the handle 60 is rotated to move the ends of the arms 62 and 64 radially inwards, the member 66 being sufficiently flexible to accomodate itself to the reduced tube diameter and therefor still providing the necessary guidance and support. It is found possible to provide with a particular apparatus for a ratio of minimum to maximum diameter of about 2:1 to 2.5:1. Thus, for example, one embodiment is able to accommodate tubes 26 of diameter from about 25 cm to about 50 cm, while another embodiment can accomodate tubes of diameter from about 56 cm to about 142 cm. The frame will usually extend to a height of about 2 meters and a typical embodiment will have from 4 to 10 sets of vertically spaced arms, each set consisting of four pairs of arms.

The apparatus of the invention is also provided with two separate first and second cooling air supply rings 70 and 72 respectively, illustrated respectively by FIGS. 3 and 4. The first or upstream air ring 70 preferably is disposed as close as possible to the annular outlet of the die 14 and is illustrated as being of a type which discharges an annular stream of cooling air, supplied to it via hoses 74, substantially parallel to the longitudinal axis 76 of the tube path, as indicated by the arrow 78. The actual structure employed in either of the air rings 70 and 72 is not essential to the operation of this invention, although the structure illustrated does have advantage in providing efficient operation and is therefore preferred.

The second or downstream air ring 72 is mounted on the sizing cage 32 a fixed predetermined distance below the cage by means of substantially vertical connecting rods 80 which hold the cage and the ring coaxial with one another. The second air ring can therefore be moved vertically toward and away from the first air ring, and will at all times be accompanied by the sizing cage disposed at the appropriate distance from the second air ring to engage the cooled solidified tube portion 26 and maintain it centered in the orifice of the secondary air ring. At the same time the stabilizing effect of the cage on the tube portion 26 as to its maximum diameter, its transverse position in the frame 20 relative to the tube longitudinal axis 76, and its opposition to vibration and oscillation of the tube is transmitted down the tube to the air ring 72 and, at very least, assists materially in maintaining the tube portion 18 coaxial with the second air ring, reducing the possibility that the tube will become sufficiently unstable to contact the second air ring with consequent disastrous effects on the tube.

FIG. 4 illustrates the preferred form of the second air ring, which is of known type, wherein the outlet aperture is arranged to direct the emerging annular stream of air somewhat radially outwards relative to the tube axis 76, as indicated by arrow 82, so that a vacuum effect is produced tending to pull the tube radially outwards in a manner that provides efficient cooling while improving stability of the tube against transverse oscillations. Cooling air is supplied to the ring by tubes 84. The central upper portion 86 of the die is screw-threaded into the die body so that its position can be adjusted upward and downward along the die axis thereby adjusting the output of air from the ring as required.

The second air ring is also provided immediately at its inlet with a mechanical stabilizing ring 88 which preferably consists of a ring formed from a plurality of individual rollers 90 of a material of low surface friction coefficient, such as the above-mentioned "Teflon" material, mounted on a suitable central support ring 92 that is supported from the underside of the second ring by brackets 94. Contact of the plastics material of the bubble with these rollers will not disrupt the bubble, and in addition the mechanical contact provides a useful degree of heat exchange to remove heat from the tube, as does also the contact of the individual rollers of the sizing frame.

If very sensitive film and/or low melt strength polymer is extruded the mechanical stabilizing ring can be replaced by plurality of small holes in the air ring directed inwards towards the bubble or by an inwardly-opening annular air orifice of the ring directing low velocity air against the bubble to provide an air cushion.

To begin film manufacturing operation the operator establishes the tube, or "bubble" as it is usually called, with the two air rings as close together as possible. The air under pressure is supplied to the bubble interior via suitable means, illustrated diagrammatically herein as comprising a central passage 96 in the die 14. It is most usual for this pressure to be sufficient to expand the tube, as illustrated in FIG. 1, since this is the most satisfactory way of producing thin films, but it is possible for the blow-up ratio to be nearly unity, so that the tube is of almost constant diameter along its length, and in that case the sizing cage 32 will be of a model to engage and stabilize a tube of this diameter.

As soon as possible the operator lifts the sizing cage and second air ring as high as possible, which will be with the second air ring just below the point at which the molten smaller diameter tube portion 18 begins its radially-outward expansion to become the larger diameter portion 26. The material is of course molten as it leaves the die and is too hot for the internal air pressure to begin the expansion. There is an inevitable small increase in diameter as the tube leaves the die, and there is also an increase in the tube wall thickness as the material escapes the high compression of the extruder and the die. The blast of air from the first air ring 70 is directed at the tube while it is undergoing this outward expansion but is limited in velocity because of the low melt strength of the hot polymer. As described above, the flow is predominantly vertical so that the inward impingement on the tube is minimized.

The provision of the longest possible distance between the two rings gives this upwardly-flowing air stream the greatest possibility of being effective in its cooling. Otherwise it might be necessary to direct the air stream inward toward the tube to increase the cooling, but this then means that the air flow and velocity cannot increase beyond the limits at which the tube will begin to oscillate and/or tear. When the melt temperature cools to the appropriate value the tube will begin to expand and, as illustrated, this takes place relatively quickly over a short distance of travel of the tube, being completed within the sizing frame.

Another advantage found to flow from providing the longest possible tube path between the two air rings is that inevitably the material is molecularly linearly oriented by the shear forces as it is extruded from the die, and its transverse tear strength is much lower than its longitudinal strength because of this orientation. The long path provides the maximum possibility for the melt to "relax" and lose this longitudinal orientation with corresponding increase in transverse tear strength. This means that higher velocities can now be used for the cooling air in the second air ring without tearing the bubble, and this improvement is added to the above-described stabilizing and supporting effect of the accompanying sizing cage. If the output of the extruder is now increased the length of the tube portion 18 will also increase because of the faster movement of the tube, and the operator simply moves the second ring and sizing cage vertically upwards to the new optimum position. Conversely, if for any reason the output is decreased the combination of second air ring and sizing cage is quickly moved downward to its new position in which the air ring will maintain its effectiveness without being fouled by the tube.

The additional mechanical or air stabilizer 88 cooperates with the sizing cage in holding the tube against transverse oscillations and coaxially with the air ring for maximum uniformity of cooling around the circumference of the tube. It also moves with the die and its value is believed to lie in the fact that it holds the tube against the inevitable relatively high air turbulence that is produced between two air rings, each of which is delivering large quantities of pressurized air to the outside of the tube.

The sizing cage may, instead of the structure described above, be that described in my above-mentioned application Ser. No. 504,185, filed concurrently herewith. In this new sizing cage the rollers and their wire support are replaced by a flexible tube provided at its radially-inwardly facing surface portion with a large plurality of inwardly facing openings which discharge respective streams of air supplied to the tubes by a pump 96 mounted on the cage via supply tubes 98. Such a structure avoids the mechanical contact between the rollers and the tube surface, which can eventually cause surface markings if not adequately cleaned and maintained, and moreover provides a useful additional cooling effect.

I claim:

1. Apparatus for the production of plastic film by the extrusion of a tube of molten plastics material from a die outlet of a die in a tube path having a tube longitudinal axis, the apparatus comprising:
   a first air ring adapted to be mounted in the immediate neighbourhood of the die outlet surrounding the tube path,
   a sizing cage adapted to surround the tube path and receive the tube of cooled material and to constrain it transversely during longitudinal movement in the tube path through the cage,
   means mounting the sizing cage for movement longitudinally of the tube path parallel to the tube longitudinal axis, and
   a second air ring mounted on the sizing cage to surround the tube path between the first air ring and the sizing cage, and movable with the sizing cage to move longitudinally of the tube path.

2. Apparatus as claimed in claim 1, and including an additional tube stabilizing means mounted on the second air ring upstream of the tube path to engage the exterior surface of the tube just before it enters the second air ring.

3. Apparatus as claimed in claim 2, wherein the said additional tube stabilizing means comprises a ring of rollers mounted for rotation about respective horizontal axes on a ring-shaped support, the ring of rollers and their support being mounted on the second air ring coaxial with the longitudinal axis of the tube path.

4. Apparatus as claimed in claim 2, wherein the said additional tube stabilizing means comprises orifice means of the second air ring discharging air inwards toward the tube path to provide an air cushion between the tube and the ring.

5. Apparatus as claimed in claim 1, wherein the first air ring is of a type which discharges its cooling air substantially parallel to the said longitudinal axis of the tube path, while the second air ring is of a type which discharges its cooling air away from the said longitudinal axis to create a vacuum force that assists in stabilizing the tube in its movement through the second air ring.

6. Apparatus as claimed in claim 1, wherein means mounting the sizing cage and second air ring for movement longitudinally of the tube path comprises an apparatus frame, guide means connecting the apparatus frame and the sizing cage to guide the sizing cage for vertical longitudinal movement relative to the apparatus frame, cables suspending the sizing cage from the apparatus frame, and motor means for winding and unwinding the cables to produce the said vertical longitudinal movement of the sizing cage relative to the apparatus frame.

* * * * *